United States Patent
Benedict

(10) Patent No.: US 11,030,568 B2
(45) Date of Patent: Jun. 8, 2021

(54) RAIL CAR TERMINAL FACILITY STAGING

(71) Applicant: Albert James Benedict, Calgary (CA)

(72) Inventor: Albert James Benedict, Calgary (CA)

(73) Assignee: Amsted Rail Company, Inc., Chicago, IL (US)

(*) Notice: Subject to any disclaimer, the term of this patent is extended or adjusted under 35 U.S.C. 154(b) by 917 days.

(21) Appl. No.: 15/229,686

(22) Filed: Aug. 5, 2016

(65) Prior Publication Data

US 2017/0032316 A1     Feb. 2, 2017

Related U.S. Application Data

(63) Continuation-in-part of application No. 15/170,283, filed on Jun. 1, 2016, now Pat. No. 10,943,318, and a continuation-in-part of application No. 14/800,226, filed on Jul. 15, 2015, now Pat. No. 10,628,787.

(60) Provisional application No. 62/051,587, filed on Sep. 17, 2014.

(51) Int. Cl.
| | |
|---|---|
| *G06Q 10/08* | (2012.01) |
| *B61L 25/02* | (2006.01) |
| *B61L 25/04* | (2006.01) |
| *B61L 27/00* | (2006.01) |

(52) U.S. Cl.
CPC ........ *G06Q 10/0833* (2013.01); *B61L 25/028* (2013.01); *B61L 25/048* (2013.01); *B61L 27/0077* (2013.01); *B61L 27/0027* (2013.01)

(58) Field of Classification Search
None
See application file for complete search history.

(56) References Cited

U.S. PATENT DOCUMENTS

| | | | |
|---|---|---|---|
| 9,489,813 B1* | 11/2016 | Beigel | G08B 13/2417 |
| 2002/0084387 A1 | 7/2002 | Matheson et al. | |
| 2003/0000479 A1* | 1/2003 | Starr | A01K 11/006 |
| | | | 119/174 |
| 2007/0146159 A1 | 6/2007 | Kato et al. | |
| 2007/0276555 A1 | 11/2007 | Kiss et al. | |
| 2008/0297322 A1* | 12/2008 | Krener | G06Q 10/087 |
| | | | 340/10.4 |
| 2013/0157664 A1* | 6/2013 | Chow | H04W 88/085 |
| | | | 455/436 |
| 2014/0266804 A1 | 9/2014 | Asadpour | |

(Continued)

*Primary Examiner* — Hunter B Lonsberry
*Assistant Examiner* — Mathew Franklin Gordon
(74) *Attorney, Agent, or Firm* — Adrian D. Battison; Ade & Company Inc.; Ryan W. Dupuis

(57) ABSTRACT

Bulk goods are transported on a rail network to a terminal which includes a loading with a metering device for measuring an amount of the bulk goods loaded or unloaded. At the terminal there is a control hub connecting to a plurality of portable hand held field computers and a communication system for communication with the rail network to obtain a Car Location Message (CLM), a way bill and mechanical data for each of the railcars. An input to the hub is provided by a plurality of self-powered scanning stations each including an RFID reader having an antenna for reading the RFID tag of an adjacent rail car where each scanning station has two radar proximity transducers responsive to presence of a rail car where the RFID reader has a quiescent mode and the radar proximity detectors activate the reader from the quiescent mode on detection of a railcar.

17 Claims, 9 Drawing Sheets

(56) References Cited

U.S. PATENT DOCUMENTS

2016/0110981 A1* 4/2016 Chin ................... A01M 29/24
340/573.1

* cited by examiner

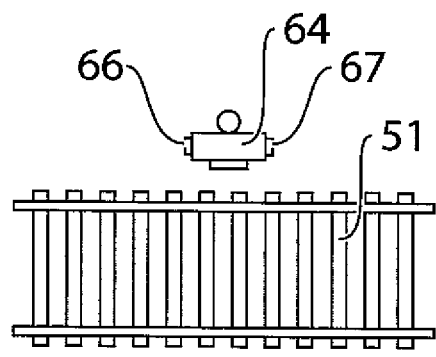
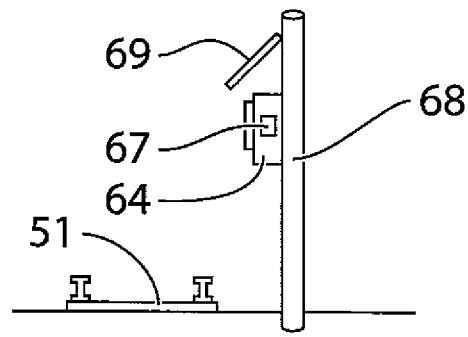
FIG. 7  FIG. 7A
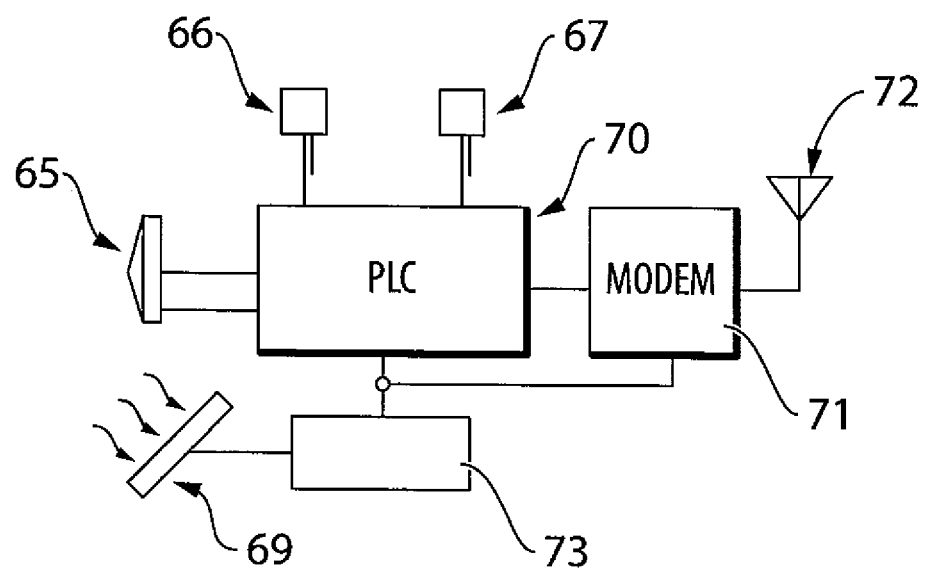
FIG. 8

RAIL CAR TERMINAL FACILITY STAGING

This application is a continuation in part of application Ser. No. 15/170,283 filed Jun. 1, 2016 and is a continuation in part of application Ser. No. 14/800,226 filed Jul. 15, 2015. This application claims benefit under 35USC119€ of provisional application 62/051,587 filed Jul. 9, 2014.

This invention relates to an apparatus to monitor and to measure the locations, the status, the staging, the sequencing of operations and the movements of rail cars and other vehicles ("the vehicle") into, through and out of rail car operations terminals.

BACKGROUND OF THE INVENTION

There are over 2 million rail cars in North America. About 500,000 rail cars are involved in the transportation of hazardous cargo, which is loaded and offloaded at thousands of rail terminals.

Rather than using the current manual and paper-based inspection system, which is prone to errors and delays, the rail industry is seeking computerized solutions to tracking rail cars through their terminals, capturing all data elements and storing in a secure environment.

The rail car terminal provides a facility for the loading, offloading, handling and storage of rail cars which may include loading and unloading stages and also possibly a transloading stage which is the process of transferring product or cargo from one vessel to another, such as to or from a rail car, tanker truck, pipeline, storage tank, barge or other containers. Transloading may also involve the measurement of the transfer, including such parameters as weight, volume, temperature, density, product components and more.

A corporation that uses railcars as part of their supply chain strategy can have substantial financial investments in the railcars themselves and the rail yard infrastructure to manage the railcars, the loading and offloading of cargo, plus servicing and storage of such rolling stock.

Railcars outside of a rail facility are usually handled by the railroad carriers and as such, beyond the management of supply chain companies. The opportunity for optimizing railcar operations is in utilizing better technology within the rail yard facility. Companies are seeking solutions to gain digital visibility of the rolling stock inside the yard.

Rail yards serve as points of origin and of destination for moving railcars throughout North America as well as other continents. Rail yards are also used as infrastructure for the railroads and their operations, as well as used by railcar service and repair facilities and railcar storage locations. Rail yards can include multiple functions such as commodity loading and offloading, cleaning, inspection, testing and storage. It is mandatory for the owner/operator of a rail yard to know the total railcar inventory and their locations within a facility.

The current methods for spotting railcars within a facility fall into three general categories: yard personnel carry pencil and clipboard and walk the tracks; yard personnel carry a portable handheld AEI tag scanner and walk the tracks, or a stationary AEI tag scanner station is mounted at the yard gate entrance for railcars. The first two methods are labour intensive, tend to introduce data errors and have data capture lags while the latter method is expensive and only it gives overall yard railcar inventory information.

SUMMARY OF THE INVENTION

According to the invention there is provided an apparatus for use in a system for transporting bulk goods comprising a plurality of rail cars arranged to be transported on a rail network to a rail car handling terminal, each rail car having at least one RFID tag including data identifying the rail car; the handling terminal comprising a plurality of rail track spur lines each for receiving one or more rail cars and a center control data hub, the apparatus comprising:

a plurality of trackside-mounted scanning stations each for mounting adjacent to a respective one of the spur lines;

a wide area point-to-point wireless communications network communicating with each of said scanning stations;

each scanning station comprising a self-contained, weatherproof unit;

each scanning station being self-powered utilizing solar energy or other sources so as not to require connection to an exterior power supply;

each scanning station comprising an RFID reader having an antenna for powering and reading the RFID tag of an adjacent rail car;

each scanning station comprising two radar proximity transducers mounted on the unit so that each is responsive to presence of a rail car at a predetermined distance along the respective spur line in a respective direction;

said RFID reader having a quiescent mode in which power from the antenna is turned off from which mode the reader can be activated;

said radar proximity detectors being always-on so as to detect the presence of the railcars and being arranged to activate the reader from the quiescent mode on detection of a railcar;

said RFID reader being arranged to revert to the quiescent mode after reading the RFID tag of the railcar.

Preferably the RFID reader is arranged to revert to the quiescent mode after a predetermined time period. However alternative arrangements for determining the step of reverting to the quiescent mode can be provided including for example the detection of the necessary data from the railcar concerned. In another arrangement, step the reverting be carried out when the radar proximity devices detect that the railcar has moved away.

In a preferred arrangement the scanner station is arranged to transmit the railcar data to adjacent scanner stations by wireless communications rather than directly to a central station such that a master station for the data communications, which preferably comprises one of the plurality of devices, collects all railcar data which is read by a plurality of the stations and communicates that collected data to a remote server.

Preferably some of the plurality of scanning stations are arranged at specific operating components of the rail car handling terminal such as a product loading location, product unloading station, cleaning station and others as described hereinafter.

Preferably the two radar proximity detectors are mounted so that they have visibility up the track and down the track and determine the presence of a railcar on the track and the direction of travel.

Preferably the scanning station includes a PLC ("Programmable Logic Controller") and wherein the PLC has logic algorithms to determine a direction of railcar travel using inputs from the two radar proximity detectors.

Preferably the two radar proximity detectors are set such that the predetermined distance is substantially equal to the length of one rail car. This is typically of the order of 20 meters.

Preferably the apparatus includes logic to determine multiple readings of data from a single rail car to extract and communicate only one reading from the multiple readings.

This can be located in individual scanning stations or in the master scanning station when this is used to communicate all of the collected data.

The railcar tag scanner station is thus designed for installation alongside railroad tracks within a facility, such as a railcar storage yard, product loading location, refinery, bulk manufacturer and such.

All railcars are each equipped with RFID tags, permanently mounted on each side of the railcar, typically one on each side. These passive or unpowered tags contain digital identification codes that match the railcar ID ("railcar markings"). When exposed to microwave energy from a trackside RFID reader, the ID code in the tag is transmitted to the reader.

As a railcar or a string of railcars approaches the scanner, the always-on radar proximity detectors detect the presence of the railcars and energize the AEI tag reader antenna. The railcar rolls by the scanner station and the equipment reads and detects the railcar ID. Once the radar units determine that the railcars are now out of range and after a short dwell period, the collected data is transmitted via cellular or wide area network to a remote server and the antenna is de-energized and the reader returns to a quiescent mode.

The internal electronics apparatus include a programmable logic controller ("PLC") or equivalent. The PLC is used to control power to the AEI scanner antenna, to handle the data communications, to capture, collate and store the railcar ID information and to monitor general functions. The scanner station is configured to transmit the digital data to remote servers via several methods, depending on local resources, i.e., via digital cable, cellular communications, wide-area network (Wi-Fi), Bluetooth or other configurations.

The scanner is configured to work in the environment of the Internet of Things ("IoT") whereby a plurality of devices can interchange data information with each other using wireless connections and Internet protocols. In this proposed invention, the scanner is able to communicate with digital devices mounted on the railcars or other apparatus in and near the railyard.

This arrangement described herein provides a method of improved management of railcars within a rail yard facility by utilizing a system that includes a plurality of trackside-mounted scanning stations and a wide area point-to-point wireless communications network.

The arrangement described herein is fully automated, offers round-the-clock monitoring and is very cost-effective. Due to the innovative design, the units can be spotted anywhere in a facility where rail tracks are located (excluding areas classified as hazardous environment).

The scanning stations are located in strategic positions in rail yard facilities, adjacent to rail tracks and aligned to detect and identify rolling stock. The plurality of scanning stations are able to interchange railcar identification information by electronic data communications.

The scanning stations are self-contained, weatherproof, self-powered utilizing solar energy or other sources.

The innovative value of this arrangement disclosed herein is in incorporating a combination of technology to detect and identify railcars; including an RFID reader, radar proximity transducers, a PLC ("Programmable Logic Controller") and ancillary equipment.

The arrangement described above is preferably used in conjunction with the system where the handling terminal comprises:

an apparatus for loading into and/or unloading the bulk goods from each of the rail cars, the apparatus including a metering device for measuring an amount of the bulk goods loaded or unloaded;

a plurality of portable hand held field computers, each comprising:
an input interface for manual input by a worker of data relating to the rail cars;
a display for displaying data to the worker;
a camera module for obtaining images of the rail cars by the worker;

said center control hub being arranged to communicate with a communication system of the rail network to obtain from the communication system a Car Location Message (CLM) for each of the rail cars prior to arrival of the rail cars at the rail car handling terminal and to obtain from the communication system a way bill for each of the rail cars prior to arrival of the rail cars at the rail car handling terminal;

the center control hub being arranged to obtain, from a data base using the unique identification indicia, mechanical data relating to each of the rail cars including at least a weight and capacity of the rail car;

the center control hub being arranged to establish a plurality of stages of operation on the rail cars, the stages including at least the following:
arrival from rail network,
loading/unloading;
storage;
cleaning and/or repair;
release to rail network;

the center control hub being arranged to generate data indicating a current stage of each of the railcars in the rail car handling terminal;

the center control hub being arranged to provide a signal indicative that a rail car can be transferred from one stage to another stage based on at least some of the data relating to the Car Location Message, the way bill, the mechanical data and the inspection;

the center control hub being arranged to communicate the signal indicative that a rail car can be transferred from one stage to another stage to the portable computers to control transfer of the rail car from said one stage to said next stage.

The Car Location Message (the "CLM") is a data message in the form of a single line of text that captures the events in the staging of a railcar to, within and departure from a facility. The CLM data message is a composite of several data elements, including but not limited to a) rail car identification code; b) load or empty status; c) state or situation of rail car, such as arrived, placed or released; d) date and time of CLM event; e) the stage event code; f) the source of the information of the event, such as the railroad, the trackside scanner or the hand held computer device; and g) other information that may be related to the CLM event.

The CLM message itself has been in the industry for over a century, dating back to the days of telegraph. However, the creation and use of CLM's for staging of rail cars within the rail car handling terminal is unique. That is the process of the present invention includes as a key point the creating a CLM upon a rail car moving from one stage to another. This is part of the uniqueness of this application.

Preferably the portable hand held field computers further include as part of the camera module, video and audio, and also a system for GPS location capture.

Sometimes the transfer from one stage to another includes physical movement of the rail car. However in other cases the transfer can occur without any movement of the rail car.

That is the rail car remains at a stationary location and passes through the different stages at that location. Where a physical step such as unloading is necessary, the rail car is typically moved to an unloading station.

At the rail car terminal there can be provided a first apparatus for loading rail cars and a second apparatus for unloading rail cars. In this case the terminal is used for both unloading the car and reloading the cars with a different material. However in some circumstances the terminal may include only unloading or only loading.

As part of the control system, preferably the center control hub provides a signal allowing operation of a loading apparatus. That is the railcar concerned is allowed to pass to the loading station under the control of the centre control hub depending upon that car meeting the necessary requirements to enter that stage.

Typically the center control hub controls the loading apparatus by providing a signal indicative of an amount of bulk goods to be metered to a full condition of the rail car. In some cases the center control hub controls metering to fill of a rail car by communicating fill information to the hand held computers so that the filling system is controlled and monitored by the worker in response to the signals to the computer. In other cases the center control hub controls metering to fill of a rail car by controlling a filling meter of the loading apparatus.

As part of the release stage, preferably the center control hub creates bill of lading for the rail cars prior to release of the rail car from the release stage of the rail car handling terminal to the rail network.

As part of the release stage, preferably the center control hub creates a Car Location Message (CLM) for each rail car prior to release of the rail car from the release stage of the rail car handling terminal to the rail network.

As part of the arrival stage, preferably the center control hub creates a Car Location Message (CLM) internal to the rail car handling terminal for each rail car prior to release of the rail car from the arrival stage into the rail car handling terminal and upon transition from each stage to the next.

In some cases there are optionally provided track side scanners at or in advance of the rail car handling terminal for reading data from each rail car including a location, way bill and Car Location Message (CLM). However these can be omitted and the operation carried out using the information from the rail network and from the inspections at the arrival stage. Where the track side scanners are used, the Car Location Message (CLM) can be used to provide advance information on arriving rail cars in advance of arrival at the arrival stage.

Preferably during the inspection the worker is required to enter into input interface inspection details relating to a mechanical condition of the rail car, a confirmation that the rail car inspected is the correct car and a confirmation of the load contained by the rail car inspected. Other information may also be included.

In order to carry out this inspection, preferably the input interface of the portable hand held field computer creates an inspection check list for the worker.

As part of the control, process, the center control hub preferably provides signals allowing loading of a rail car dependent on information relating to a previous load obtained from the previous way bill. That is, the information previously received by the communication system concerning the previous way bill of the railcar concerned gives information concerning whether the commodity to be loaded into the railcar is compatible with the prior contents. In other cases where the commodities are compatible, the center control hub acts to verify the cargo compatibility and permit the railcar to be loaded without requiring the cleaning stage. In the case that the cargo to be loaded is not compatible with prior contents, the center control hub does not allow loading to take place without passing through the cleaning stage.

That is that, in some cases, the center control hub provides signals requiring cleaning of a rail car prior to loading dependent on information relating to a previous load obtained from the previous way bill.

In some cases, depending upon on inspection, the center control hub provides signals allowing transfer of a rail car to the storage stage dependent on information from the inspection including a requirement for repair and/or an off-lease condition of the rail car.

Preferably as one part of a display protocol, the center control hub generates an output on said display providing data relating to all rail cars in the rail car handling terminal and their current stage.

Preferably as another part of the display protocol, the center control hub generates an output on said display providing data relating at least some of the stages and the identification of the rail cars in those stages.

Preferably the center control hub stores for each rail car in the release stage information relating to identification of the rail car, load in the rail car, inspections carried out on the rail car and photographs of inspected parts of the rail car, together with geographical location on each railcar at each stage, and date/time stamp of arrival at each stage. This information is maintained in a storage or memory for subsequent release in the event of a dispute or question concerning the condition of the railcar at a subsequent time.

As another part of the system, preferably the center control hub maintains a list of customer orders. As part of this system the center control hub selects for each customer order a rail car dependent upon mechanical data obtained from the data base and the previous load obtained from the waybill.

The stages defined above may include the following sub-stages:

Arrival:
SL—Shipper Loaded
Railcar provided by a shipper has arrived at the serving rail carrier yard and has cargo. The terminal has been notified that it is available for placement at the plant.
RL—Railcar Loaded
The user's railcar has arrived at the serving rail carrier yard and has cargo. The terminal has been notified that it is available for placement at the plant.
CE—Customer Empty
Railcar provided by a customer has arrived at the serving rail carrier yard and is empty. The terminal has been notified that it is available for placement at the plant.
RE—Railcar Empty
The user's railcar has arrived at the serving rail carrier yard and is empty. The terminal has been notified that it is available for placement at the plant.
PR—Product Return—Loaded in Plant
Railcar is being received back at the serving rail carrier yard and has cargo. This is typically caused by rejection of product by a customer due to off-specification or due to an over-weight car blockage by a rail carrier. The terminal has been notified that it is available for placement at the plant.
PL—In-Plant Loaded
Railcar has been actually placed in the plant by the serving railroad and has cargo.
PE—In-Plant Empty Railcar has been actually placed in the plant by the serving railroad and is empty.
Loading Unloading:
UL—Unloading
Railcar has been positioned for offloading of cargo or is already offloaded.
LD—Loading
Railcar has been positioned for loading of cargo or is already loaded, but not yet billed out.
LH—Load and Hold
Railcar has been loaded with cargo and is to be held for assignment of order.
TL—Transloading
Transferring product or cargo from one vessel to another, such as to or from a rail car, tanker truck, pipeline, storage tank, barge or other containers.
Release:
BL—Billed Loaded
Railcar inside the terminal has cargo and now has a bill of lading. It is scheduled to depart on the next serving carrier switch.
BE—Billed Empty
Railcar inside the terminal is empty and now has a bill of lading. It is scheduled to depart on the next serving carrier switch.
Storage:
PS—In-Plant Storage
Railcar is to be relocated inside the terminal for storage.
OS—Off-Site Storage
Railcar is to be relocated outside the terminal for storage.
Cleaning/Repair
CL—Cleaning
Railcar is to be cleaned out of product, residue or heel.
TR—Test Required—On Rent
Railcar is in the terminal with a test required and is still well within the lease rider period. The decision to proceed with the test has been made.
TO—Test Required—Off Rent
Railcar is in the terminal with a test required and the lease rider is due to expire.
The decision must be made whether or not to proceed with the test.
RR—Repair Required—On Rent
Railcar is in the terminal with repair required and is still well within the lease rider period. The decision to proceed with the repair has been made.
RO—Repair Required—Off Rent
Railcar is in the terminal with repair required and the lease rider is due to expire. The decision must be made whether or not to proceed with the repair.
IS—In-Plant Shopped
Railcar is in a repair facility within the terminal.
ES—External Shopped
Railcar is in a nearby repair facility but off the terminal property.

One objective of the arrangement as described herein is to collect, consolidate, organize and preserve the data information relevant to safe and efficient operations at rail car loading/offloading/storage terminals and to make that information available upon demand in a secure manner to operators, owners and inspection officials. To capture and preserve the inspection of rail cars through digital technology, including handheld field computers with integral GPS, camera, video and audio technology, to eliminate paper trails, human entry errors and to improve timeliness and completeness of critical information.

This Terminal Staging Process is a method of improving the safety and the efficiency of a rail car operations terminal ("the terminal") by means of collecting key information from various operations in digital formats, storing the information in a central data hub and then using that information for safety, security and optimizing purposes.

The central digital data hub is a database repository with designated formats of electronic data interface (EDI) standards for the input and output of events and records. The data hub has the ability to relate various railcar and terminal events so that all of the activity of any vehicle approaching, moving through or departing from a terminal can be captured and reported at any time.

By utilizing field wireless computer technology on and near the vehicles, real-time data can be collected into the data hub so that the terminal can then be optimized for efficiency, safety, security and performance.

Once a vehicle arrives at a terminal, there are various actions that may or must take place in predetermined sequences or stages in order to ensure that the vehicle is inspected, cleaned, stored, loaded or unloaded as required by operations. The skipping of a stage or the execution of stages in an incorrect sequence could result in expensive, hazardous or catastrophic consequences.

The arrangement herein utilizes technology of rugged industrial wireless apparatus to determine vehicle location, status, contents and stage sequence. The database repository and software applications monitor the vehicle staging to ensure correct and efficient sequences. The whole system manages the staging through the terminal, ensuring completion of one stage before moving on to the next stage and to determine the correct choices of the next stage. Each stage is fully documented in a digital format for record keeping and to ensure that the operations meet compliance with safety rules.

The rail car terminal facility staging process as described in more detail hereinafter is designed for, but not limited to:
Identifying the discrete steps of operations or the stages at a rail car terminal;
Identifying the valid options of stage sequences through a terminal;
Identifying and managing the mandatory and optional tasks at each stage before permitting the vehicle to advance to the next stage;
Using a User Interface Display ("UI") to monitor the progress and status of the vehicles at the various stages of a terminal, and to alert operators of any anomalies;
Measuring the performance of each stage in a terminal, for throughput, efficiency, task completion and error reduction;
Integration of digital wireless computerized field equipment for real-time data collection from each of the stages.

The objective of the system as described hereinafter is to manage the transition of the railcar at a facility, from arrival, through un/loading and then either storage or departure. The operator can be an order processor, shipping clerk, terminal manager or traffic coordinator. The system handles logistics, terminal performance and financial verifications.

The main objectives are:
One-screen access to moving railcars through the stages at a terminal,
Simplify all the steps in handling a railcar for arrival processing and release,
One-step process for connecting railcars to orders, billings and products, Coordinate and control the details of railcar operations, including inspection, cleaning, loading, transloading or offloading, storage fees, documents such as bills of lading and hazardous materials, Measure the performance and capabilities of terminals, Verify all relevant costs of operations, such as demurrage and storage, Address the users' needs where Yard module is not a choice.

Each railcar is flagged for staging through the processes of the yard. Staging is the sequencing of the movements of a railcar through a yard in order to accomplish tasks, such as loading, offloading, cleaning, inspection and storage.

BRIEF DESCRIPTION OF THE DRAWINGS

One embodiment of the invention will now be described in conjunction with the accompanying drawings in which:

FIG. 7 is a top plan view of one example of an installation at a selected location and illustrates a typical placement of the scanner station adjacent to a railyard track, plus the arrangement of the mounting pole and solar panel.

FIG. 7A is a side elevational view of the installation of FIG. 7.

FIG. 8 is a schematic illustration of an internal configuration of one of the scanning stations and illustrates the components and the inter-wiring between the devices.

In the drawings like characters of reference indicate corresponding parts in the different figures.

DETAILED DESCRIPTION

Figure 1:
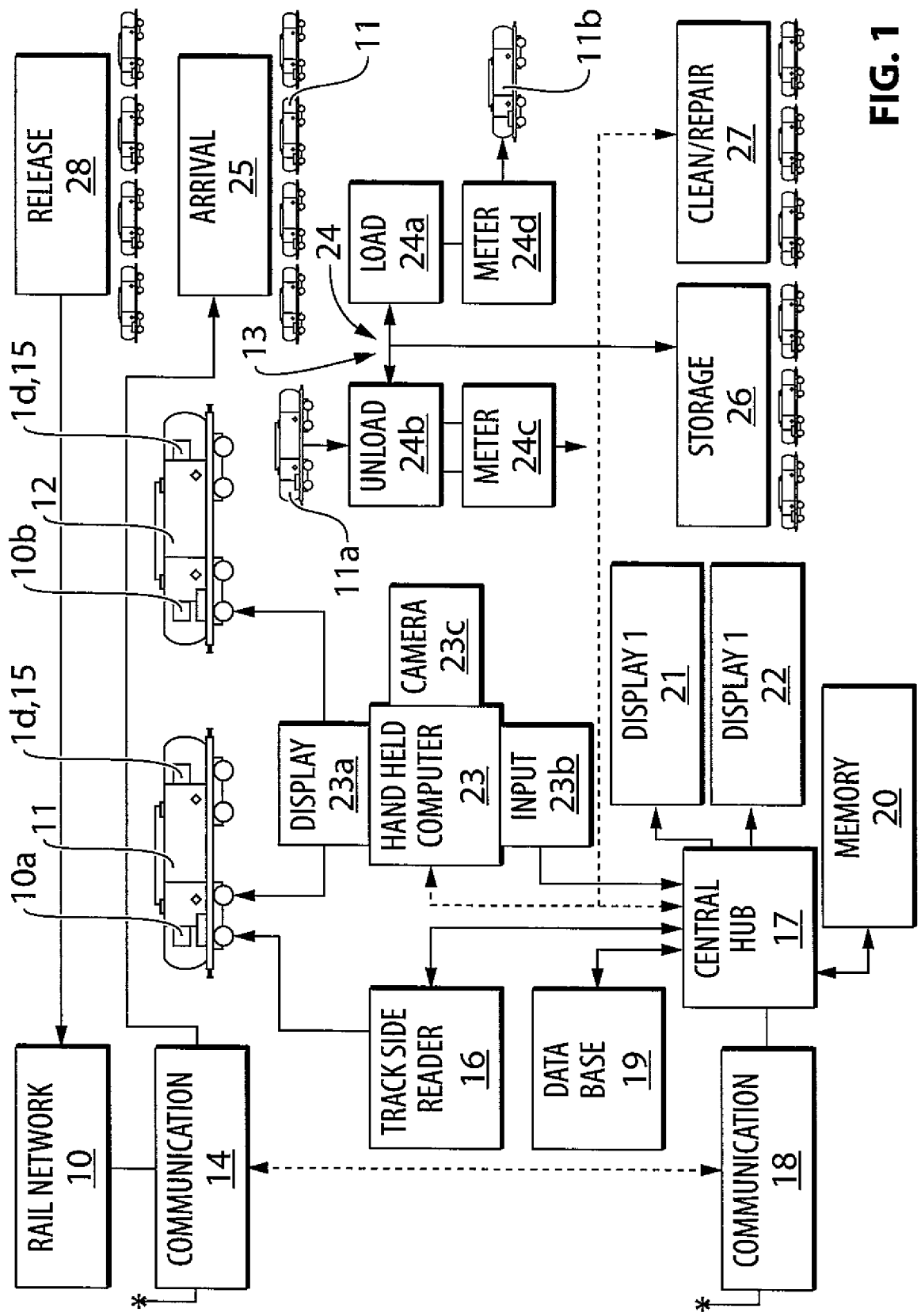
FIG. 1 is a schematic illustration of the components of a system according to the present invention.

The system shown in FIG. 1 comprises a rail network 10 for transporting railcars 11, 12 to different locations which include a remote location from which railcars on transmitted to the railcar terminal 13 term generally in FIG. 1.

The rail network is of course a conventional system in use for many years and includes many different protocols for operating the rail network including a communication system 14 which receives information generated by the network for communication to different users at different locations including the railcar terminal 13.

Each of the railcars 11, 12 includes a label indicating a unique identification code as indicated at 15. The code can be read by many different systems including bar codes and visual inspection for entry of that unique code into the control system of the terminal 13.

In some cases the apparatus disclosed herein for managing transportation vehicles includes a series of separate containers 10A, 10B each having a mounting arrangement for attachment to a respective one of the railcars 11, 12 at a suitable location on the railcar where it can be maintained safely from damage or tampering but is readily accessible on the exterior for repair.

In this situation, the system further includes track side reader devices 16 to be located at the shipping location and at the receiving location at the terminal 13.

Each container 10A includes a memory for storing received information, a transmitter for wirelessly transmitting required information from the memory when requested, a receiver for receiving a wireless request signal, a power supply and a control unit which operates the functions and acts to write data into the memory and to retrieve it from the memory when required, all stored within a secure outer shell. The control unit acts as a reader/writer for storing data in the memory.

In one mode of operation of the first reader device, it is arranged to provide an output on a display of all vehicles within the transmitter range to indicate imminent arrival of the vehicles at the location of the first reader device. This can be operated with the GPS system for detecting a current location of the container on the vehicles to be transmitted and displayed.

Further details of an arrangement of this type are disclosed in pending Canadian application 2897787 published Mar. 17, 2016 under the title "Apparatus for managing transportation Vehicles", to which reference may be made for access to these further details.

The control system of the terminal 13 includes a central data hub 17 which is a programmed computer system operable to manage the different aspects of the terminal on the railcars passing through the terminal. The central data hub 17 includes a communication system 18 for communication with the exterior including particularly the communication system 14 of the rail network and also where necessary with exterior sources of information using a required communication system such of the Internet. The central hub 17 further includes access to a database 19 of information either as part of the central hub 17 or at a remote location through communication systems. The computer system further includes a memory 24 storing and retrieving information generated by the other components of the system for use in the management of the whole system is controlled by the central hub 17. The control system further includes displays including display 21 and display 22 for displaying information to various users of the current status of the system and all the specific instructions and requirements as generated by the control system.

In this way the central hub 17 can receive from the communication system 14 of the rail network a car location message (CLM) for each of the railcars prior to arrival of the railcars and the terminal 13. In the same way the central hub can receive for each of the railcars a waybill relating to the load on the railcar and the destination for that load. The CLM and the waybill are conventional systems weld used in the rail network and containment standard information for use in management of the rail network.

The central hub 17 further obtains from the database 19 using the unique identification information 15 from the railcar, mechanical data relating to the respective railcar including at least the weight of the railcar concerned and the capacity of the railcar. In many cases this information is available within a database at the terminal. In other cases where the information is not available on that database, the information can be obtained by an external communication with a remote database which contains the required information for all existing railcars. This using either system as required, the central hub obtains the mechanical data above concerning the railcar enroute to the terminal 13.

Also the system includes a plurality of hand-held input computers 23 which communicate wirelessly with the central hub 17. These are arranged to be carried by workers operating in the terminal 13 to provide information and instructions to those workers and to receive the data input by the workers. Thus each input computer includes a display 23A, a keyboard input 23B on the camera module 23C. The hand-held computer 23 further contains enough processing power to communicate data to and from the central hub 17 and to operate the components for communication with the worker and for obtaining and transmitting images generated by the camera module 23C together with the GPS for spatial location.

The terminal further includes a loading and unloading station generally indicated at 24 which includes one or both of a loading apparatus 24A and unloading apparatus 24B. The unloading apparatus includes a meter 24C for metering the material as it unloads from the railcar 11A. The loading apparatus includes a meter 24D for metering the material as it is loaded in two the railcar 11B. The loading and unloading apparatus is controlled by the central hub 17.

The terminal further includes an arrival stage generally indicated at 25 after which the railcars from the rail network are entered as an initial physical location of the railcars 11. In addition the terminal further includes a storage stage 26 and a clean/repair stage 27. Yet further the terminal includes a release stage 28.

Both the control unit provided by the central hub 17 acts to establish a plurality of the stages of operation on the railcars including: arrival from the rail network; loading/unloading; storage; cleaning and/or repair; and release to the rail network.

As explained herein, the central control provided by the hub 17 acts to control the transfer of the relevant railcar from one stage to the next stage. This control is dependent upon, in some cases, an inspection carried out by the worker carrying the hand-held computer 23. But is that, in between at least some of the stages, the control 17 instructs the worker to carry out an inspection of the railcar concerned and data relating to the inspection into the input interface 23B of the portable computer.

In many cases the inspection as controlled by the control hub 17 includes a checklist of items to be inspected including the mechanical condition of the railcar, a confirmation that the railcar inspected is the correct car identified by the unique ID code and a confirmation of the load contained by the railcar inspected. The checklist can include many other items that need to be inspected including the presence of seals, the mechanical condition of the various components of the railcar.

From the information defined above which has been collected by the central hub 17 from the various sources defined above, the central hub generates data indicating current stage of each of the railcars within the railcar handling terminal 13. The central hub thus monitors the passage of the railcar through the terminal from one stage to another depending upon the processes required on that particular railcar for the load concerned. In particular the central hub 17 generates a signal indicative of the railcar can be transferred from one stage to the stage based upon the data defined above concerning the CLM, the waybill, the mechanical data and the inspection or inspections.

In order to control the movement of the transfer of the railcar from one stage to another stage, in most cases this is controlled by providing an indication to the worker on the portable computer that the railcar, transferred from one stage to another stage. In some cases this involves a physical movement of the railcar which is carried out under the control of the worker and with the permission signals generated by the central hub 17. In other cases the railcar remains at a constant location and the transfer from one stage to another stage is in effect a control condition generated by the control hub. In this way the control hub 17 has data defining the current stage of each of the railcars together with the rules which allow that railcar to transfer to the next stage. Of course also the rules define the next stage to be entered depending upon the requirements for that railcar on the condition of the railcar.

For example, the control hub 17 controls the loading or unloading of the railcar after the railcar has entered that stage by sending control signals to the specific loading or unloading device and particularly the metering component of that device. The hub 17 can control the loading apparatus by providing a signal to the metering component of an amount of boat goods to be metered into the railcar sufficient to reach a full condition of the railcar. In some simpler cases, the control of the fill level can be provided by communicating fill information to a handheld computer of a worker at the loading system who manually controls the metering component.

As part of the operation of the control hub 17, at the release stage of 28, the control hub generates a waybill or bill of lading for the railcar concerned prior to release of the railcar from the release stage 28. Also as part of this release protocol at the release stage 28, the hub 17 generates a CLM for the railcar.

As a part of the operation of the control hub 17, the hub generates a CLM for each stage which is internal to the terminal rather than external to the rail network for use in managing the railcars as they pass through the different stages of the terminal 13.

The hub 17 further controls the passage of the railcars from one stage to another dependent upon the condition of the cause. For example the hub 17 allows loading of a railcar in dependence upon information relating to a previous load of that railcar as obtained from the waybill detected prior to arrival of the railcar at the terminal. In some cases the new load to be entered is compatible with the previous load so that the railcar may move directly from unloading to loading. In other cases the loads are incompatible requiring movement of the railcar to the cleaning stage 27. In yet other cases the information that available to the hub 17 from inspections and from the other communications indicates that the railcar concerned requires a repair or other service so that the railcar must be moved to the section 27 for that activity. In yet other cases, the hub causes that the transfer of a railcar to the storage stage 26 is dependent upon information obtained by the hub 17 from the inspections or otherwise for example relating to a repair condition or to an off lease condition of the railcar.

Figure 2:
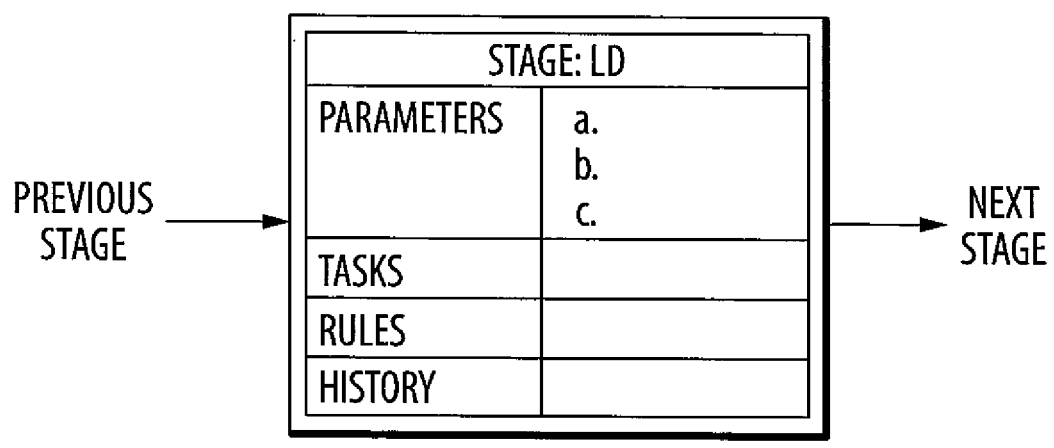
FIG. 2 is a block diagram of the properties of a stage to enable a rail car to move from one stage to another in the system of FIG. 1.

As shown in FIG. 2 there is a schematic illustration of the operation of control hub 17 in transfer of a railcar from a previous stage of to a next stage. In this case the control hub obtains information relating to various parameters of the railcar as defined above to get the tasks necessary for that railcar. This information is related to a series of rules, taking into account the history of operation of the railcar concerned to establish whether the railcar concerned, moved to the next stage. In addition the same algorithm can determine which stage should be entered next. As set forth above in some cases a railcar may be moved from unloading to repair or to storage or to the loading station. The selection is made by the control hub 17 depending upon the above conditions and parameters.

Figure 3:
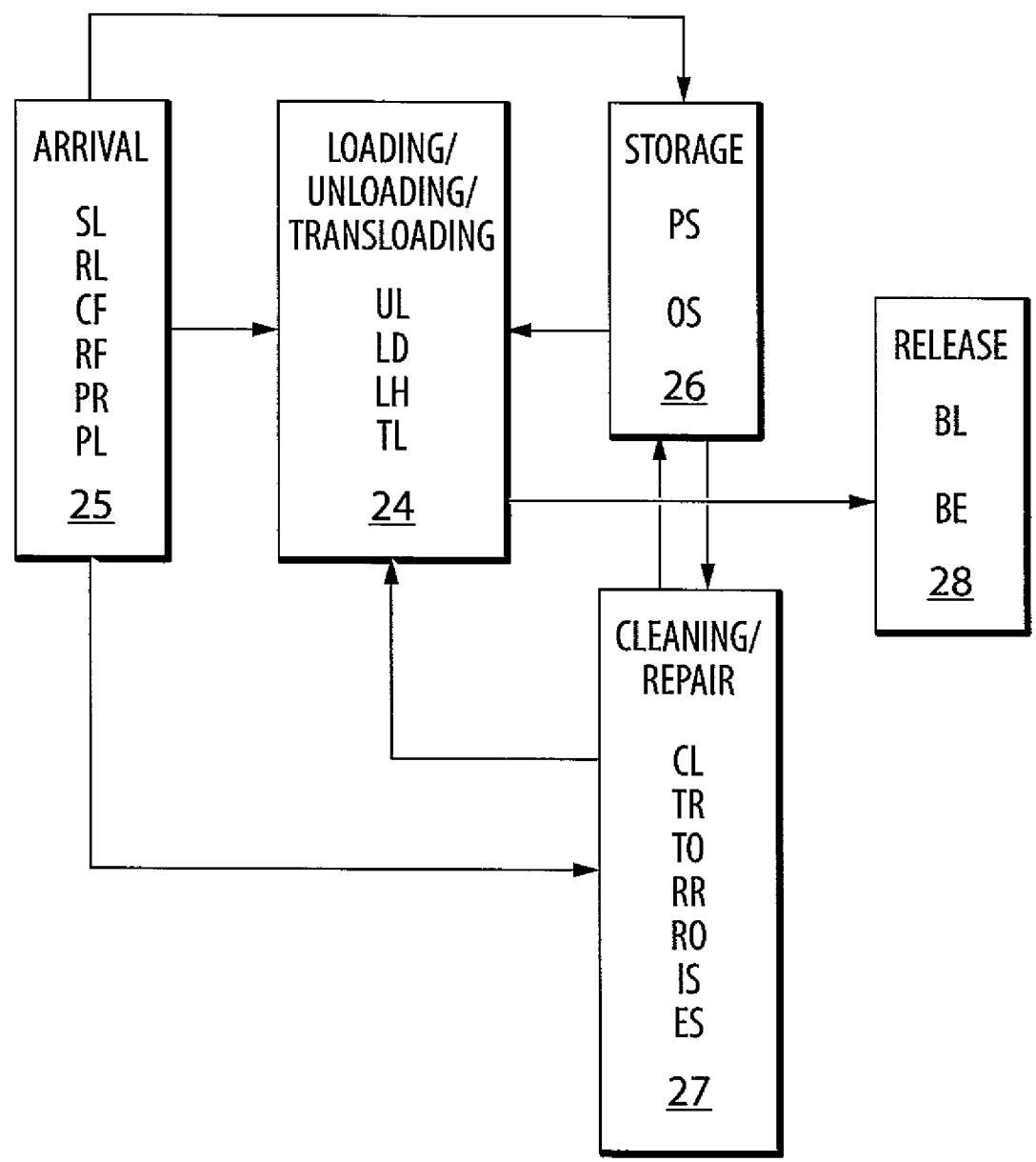
FIG. 3 is diagram showing potential paths between stages.

As shown in FIG. 3, each of the stages includes a plurality of sub-stages. Thus the arrival stage includes a series of possible alternatives of the railcar concerned as defined above. Depending upon the above alternatives and the inspection is carried out, the railcar concerned can be moved to a selected one of the stages of 24, 26, 27 or 28. From the stages 26 and 27, the car can be moved to the stage 24 in the event that the railcar is available, in ready condition and is required.

Figure 4:
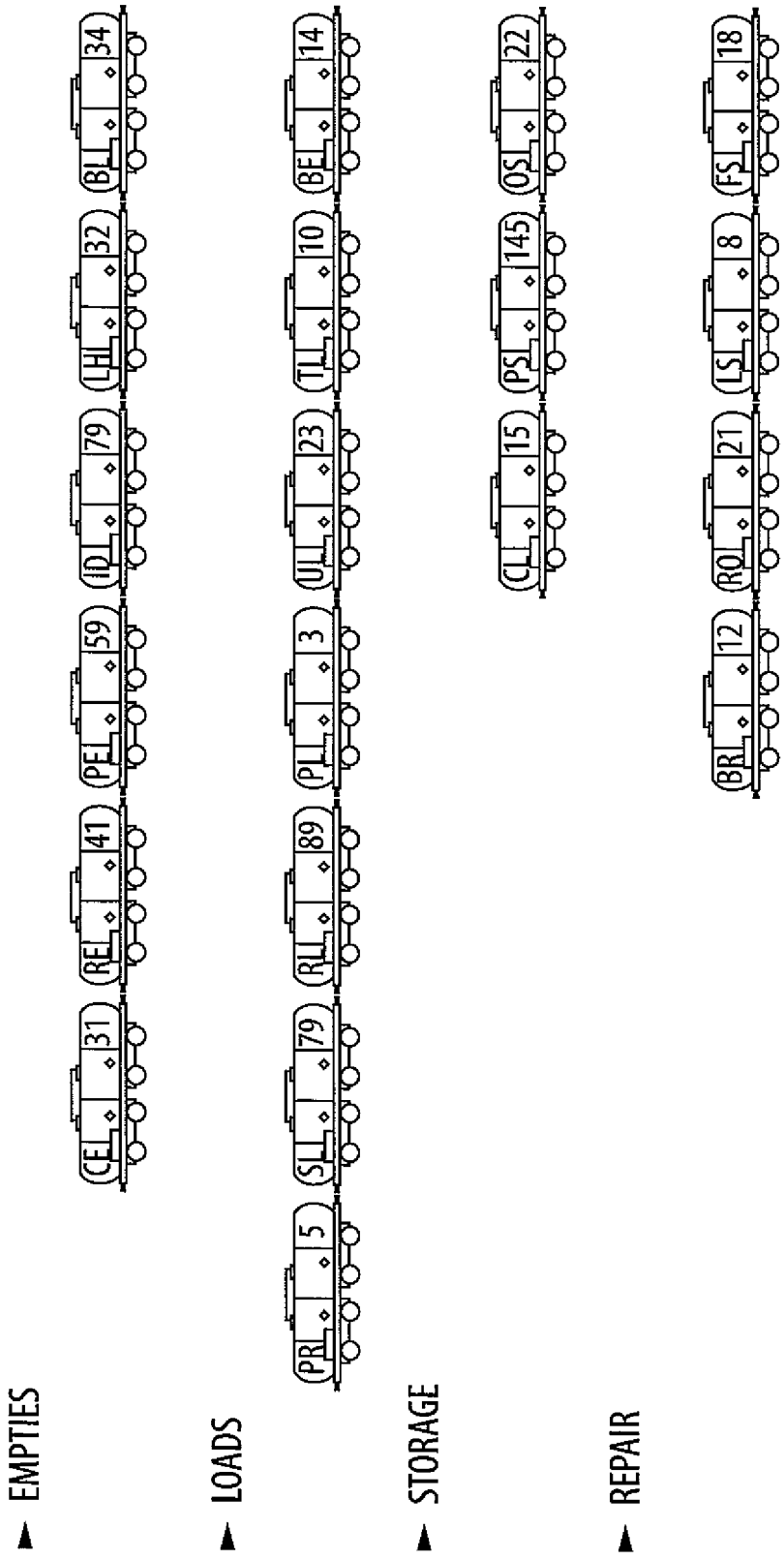
FIG. 4 is an illustration of one display of the system on the system of FIG. 1.

As shown in FIG. 4, one display screen capture of the control hub 17 on one of the display elements 21, 22 is shown which indicates for each of a series of stages the number of railcars in that stage together with an identification number identifying the particular railcar concerned.

As set forth above, the status of rail cars approaching or at a rail terminal can be defined as one of twenty-two distinct stages. The arrangement herein uses electronic digital devices and databases to identify the current stage of a rail car and to control and monitor the vehicle's progress through the required stages for a successful outcome.

Each rail car terminal utilizes at least two and possibly up to twenty-two stages for processing the rail cars. The selection of the stages is dependent on several factors, including the type of rail car, the type of cargo, the facilities at the terminal, the configuration of the terminal plus other factors.

The sequence of the rail cars through the stages at a terminal is controlled by rules that are pre-set by the operators at the terminal. The Terminal Staging Process ensures that the right rail car is moved to the correct next stage in a safe manner and that the previous stage was executed completely and all documentation was captured and stored electronically.

Each stage has the capability of receiving and storing the rules that govern whether a rail car can move to that stage, what tasks are to be performed by or on that rail car at that stage, when a rail car can exit a stage and the options of selecting the next stage. These are stored in the data hub.

The database is the repository for all of the rules governing the parameters of the stages.

The rail terminal administrator has access to a UI display for selecting and adjusting the stage parameters as necessary. Terminal operators have a UI display for showing the count of railcars positioned at the various stages and have software tools for requesting the advancement of the rail cars through the terminal.

One feature of the apparatus is the handheld computer tablet at the location of inspection of the rail car. The computer tablet is an industrial rugged device which includes built-in GPS locating, camera, calendar/clock, bar code scanner, wireless communications and proprietary inspection sheet software.

One novel feature of this design is the integration into rail car inspection sheets of the features of GPS, camera, audio, date/time stamp and wireless communications.

The check list defined for the worker by the hand held computer is capable of, but not limited to:

Recording all key information on the mechanical status of a rail car through a simple check list entry screen Capture the geographical location, date and time of a rail car inspection and the identification of the rail car inspector.

Capture digital images of each step of the rail car inspection, for either mandatory or elective events or features.

Capture still image, video and/or audio information at the point of inspection in the terminal yard.

Store all digital images, audio and video information, linked to the specific physical feature of each rail car, for future reference, comparison and regulatory requirements.

Ensure that each and every rail car has been fully inspected and meets regulatory compliance.

Inspecting rail cars during the trans-loading operation, to ensure the right railcar with the right safety requirements is being loaded or offloaded with the appropriate product to the appropriate volume or weight for that railcar and that all safety features are in place and are operational.

Capture by image and data entry all safety equipment, including the closure of valves, inspection and access hatches.

Capture the identification of security seals by optical reading of imbedded bar code identification.

Transfer the captured digital information with the terminal digital data hub through a wireless connection where available; otherwise through an Ethernet cable connection.

The rail car terminal digital data hub is a central data repository that may be, but not necessarily located at the terminal itself. The function of the hub is to be a collection database for all information that involves and defines the functions of rail cars passing through terminals, and includes but is not limited to:

Tracking the locations and the estimated times of arrival (the "ETA's") of rail cars inbound to the terminal.

Identification of rail cars upon arrival at the terminal, usually by stationary trackside RFID tag reader stations.

Capture of the bills of lading or waybills on the cargo on board the rail cars.

Capture of the inspection sheets of arrived rail cars through the handhelds.

Assignment of the rail cars to the various stages of operations inside the terminal, such activities including inspection, loading, offloading, cleaning, servicing, testing, storage and more.

Monitoring and capture of product trans-loading into or out of the rail car, including volumes, weight, density, temperature, loading factors, hazardous cargo properties and more.

Capture and retention of various mechanical properties of the rail cars, such as type, length, height, tare and gross weights, volumetric capacity, service schedules, outage tables, safety and service valves and other features.

Documentation preparation and retention, such as loading and offloading instructions, bills of lading, customs clearance, material safety data sheets (MSDS) and transportation of dangerous goods sheets (TDG), rail car switching lists and inspection sheets.

The collected data in the digital data hub is stored, organized, collated and indexed. The historical information is available for various measurements, such as terminal throughput performance, optimization, and verification of safety standards such as full rail car inspections, rail car service and repair scheduling and for the preparation of key performance indicators (the KPI's) of terminal operations.

Figure 5:
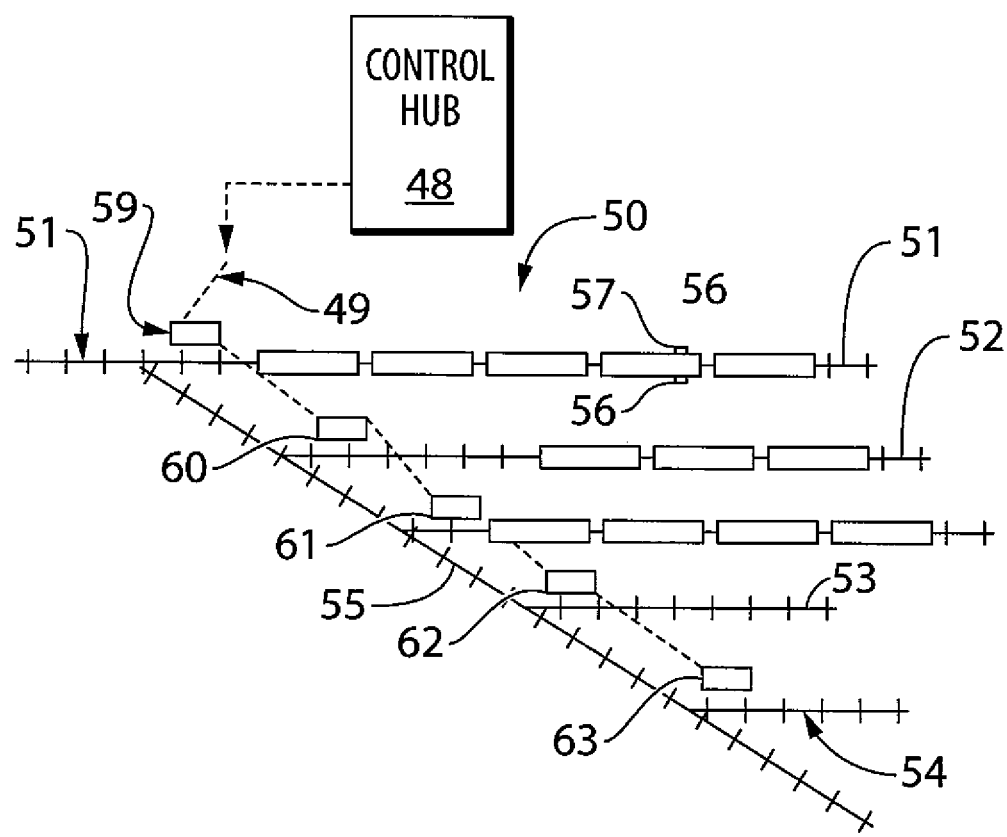
FIG. 5 is a schematic illustration of a rail yard showing a typical example of a rail yard layout of parallel rail spurs, with proposed locations of the tag scanner stations and the wireless intercommunications connections of the present invention.

As shown in FIGS. 5 to 9 there is shown an arrangement of scanning station for use with the arrangement of rail handling terminal as described above. The rail handling terminal as shown in FIG. 5 generally indicated at 50 comprises a series of rail track spur lines 51, 52, 53 and 54 each of which is connected to the next at a track portion indicated at 55. Each track receives a series of railcars 56 feature which has RFID tracking devices 57 and 58 on respected sides. A series of trackside mounted scanning stations 59 to 63 are provided in the handling terminal preferably at junctions between the spur line tracks on the connecting track 55. Thus the scanning stations are arranged to detect the entry of a railcar or train of railcars into the respective track.

Figure 6:
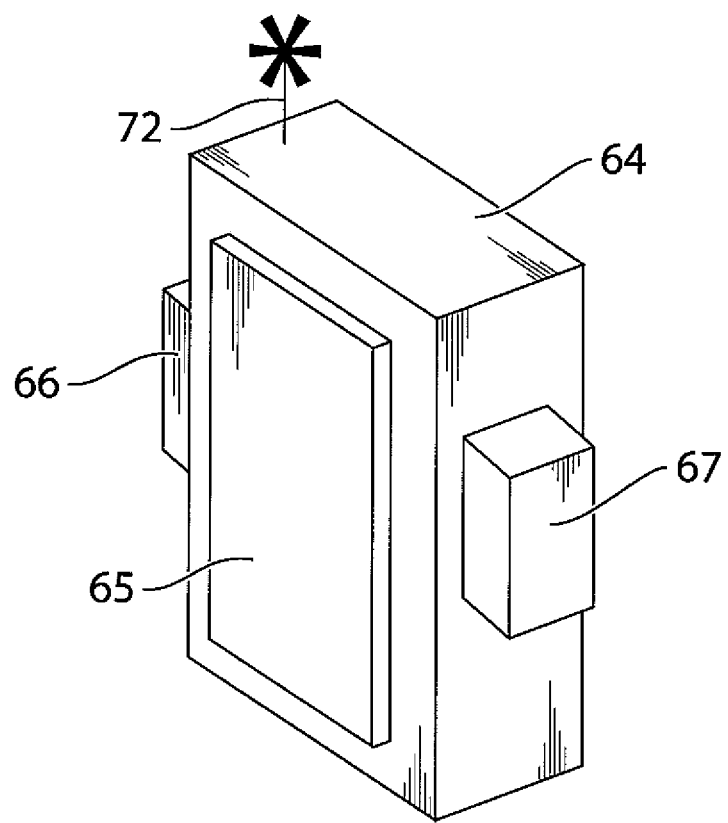
FIG. 6 is an isometric view of a scanner station and illustrates the main external components mounted on an enclosure.

As shown in FIG. 6, each scanning unit comprises a weatherproof housing 64 containing the electronics described hereinafter together with an antenna 65 mounted on the exterior of the housing which acts to communicate with the RFID tags on the rail car. In addition the housing carries two radar proximity detectors 66 and 67 each on a respected side of the housing slot shown in FIGS. 7 and 7A transducers 66 and 67 on the side of the housing 64 are arranged so as to be directed in opposed directions along the track 51. The housing 64 is carried on a post 68 associated with a solar panel 69 supplying power to electronics of the housing.

As shown in FIG. 8, the electronics of the scanning station contained within the housing 64 include a PLC 70 which communicates with the antenna 65 of the RFID reader system. The PLC further communicates with the transducers 66 and 67 to receive the signal there from indicative of the proximity of an adjacent railcar. The PLC further communicates with a modem 71 arranged to transmit data wirelessly through an antenna 72. The scanning station is arranged to be powered by local power rather than an exterior power supply from a mains wire system. Thus for example the apparatus includes the solar panel 69 which communicates power to a battery pack 73 to maintain the operators powered at all times regardless of whether power is currently being received from the panel 69.

The plurality of scanning stations is able to interchange railcar identification information by electronic communications, whether by wire cable, by wireless wide area network, by cellular network, by satellite communications or any other means.

FIG. 5 shows a representative small portion of a railyard facility, including rail tracks 51 to 54, railcars, tag scanning stations 59 to 63 and a wireless interconnection 49 connection to a control hub 48 having the components for to describe. The railyard has a plurality of rail tracks with layout of multiple spur lines depending on the railyard purpose and size. Railcars are shunted in and out of the railyard, passing over and directed into and out of the selected spurs by track switches.

As the railcars approach a tag scanner, the radar proximity technology detects the presence of the railcar, thereby energizing the tag antenna. As the railcar passes by the scanner station, the railcar identification is read from the railcar's RFID tag. After all railcars have rolled past the scanner station and after a set period of inactivity, the scanner station transmits the railcar data to adjacent scanner stations by wireless communications. One of the scanner stations is the master station 59 for data communications, collects all railcar tracking information, and then communicates that information to a remote server using a cellular network 49, a satellite communications link or other available methods.

FIG. 6 shows the proposed external appearance and components of the tag scanner station. The components are mounted on and in a weatherproof industrial-grade enclosure. The tag scanning antenna is used to interrogate the railcar RFID tags for railcar identification. The two radar proximity detectors 66, 67 are mounted so that they have visibility up the track and down the track and determine the presence of a railcar on the track and the direction of travel.

Inside the enclosure there is provided other electronic apparatus including a logic controller, either a programmable logic controller (PLC), a remote terminal unit (RTU) or equivalent, for the management of logic decisions and for the communications link. The scanner has ancillary equipment for self-sufficient electrical power, such as a solar panel, storage battery and power regulator. The whole apparatus is mounted on a utility support mast, to be positioned adjacent to the rail track.

FIG. 7 shows the positioning of the scanner alongside a typical rail track. The unit is mounted on a utility mast, which is offset from the rail track to allow safe clearance from the rolling stock. The enclosure is aligned parallel to the track so that the radar proximity detectors 66, 67 have a clear line-of-sight up and down the track. The enclosure is mounted at a height to optimize the reading of the railcar RFID tags and the solar panel 69 is positioned for optimum solar exposure.

FIG. 8 shows the interconnections of the major components of the scanner. The central data processing unit 70 can be either a PLC, an RTU or equivalent electronic computing device, which is capable of monitoring the open or closed position of switches, the interchange of digital text data, of monitoring analogue data such as voltages, the calculation of logical decisions and the putting out of digital text data and other information. The PLC interfaces with the RFID tag scanner antenna 65 and control the power feed to the tag scanner. The scanner antenna is capable of interrogating the railcar-mounted RFD tags and extracting the railcar identification marking information as the railcars pass by the scanner station. The PLC receives the tag information as a sequential text feed of ASCII information. That information is stored in the PLC along with other information, such as date and time of the event, the AEI scanner station identification, power voltage and more. When the PLC determines that the tag scanning of a railcar or a sequence of railcars is complete, using information from the radar proximity detectors, the PLC then compiles a package of the data and transfers that information to the communications modem.

The presence of railcars near the AEI scanner is determined from the two radar proximity detectors 66, 67. One unit is directed up the track and the other is directed down the track. The PLC house logic algorithms to determine direction of railcar travel using inputs from the radar units. If the radar unit 66, 67 detects the appearance of a moving object, then the railcar is located up the track, moving to down the track. At this time, the PLC starts energizing the tag antenna 65 in preparation for a tag scan operation. As the railcar continues past the station, the down-track radar unit detects the railcar. While either radar unit is detecting the presence of such railcars, the tag antenna remains energized. After both radar units stop reporting the presence of railcars and after a predetermined time lag, the tag antenna is de-energized. The role of the radar units is to determine railcar direction of travel and to help manage power demands on the power supply.

The scanner station uses an internal storage battery 73 for system power. The battery is recharged using a solar panel 69 and a power regulator.

The PLC communicates to other scanners, to other IoT devices in the railyard and to remote servers such as control hub 48 via a communications modem 71 and external antenna 72.

Figure 9:
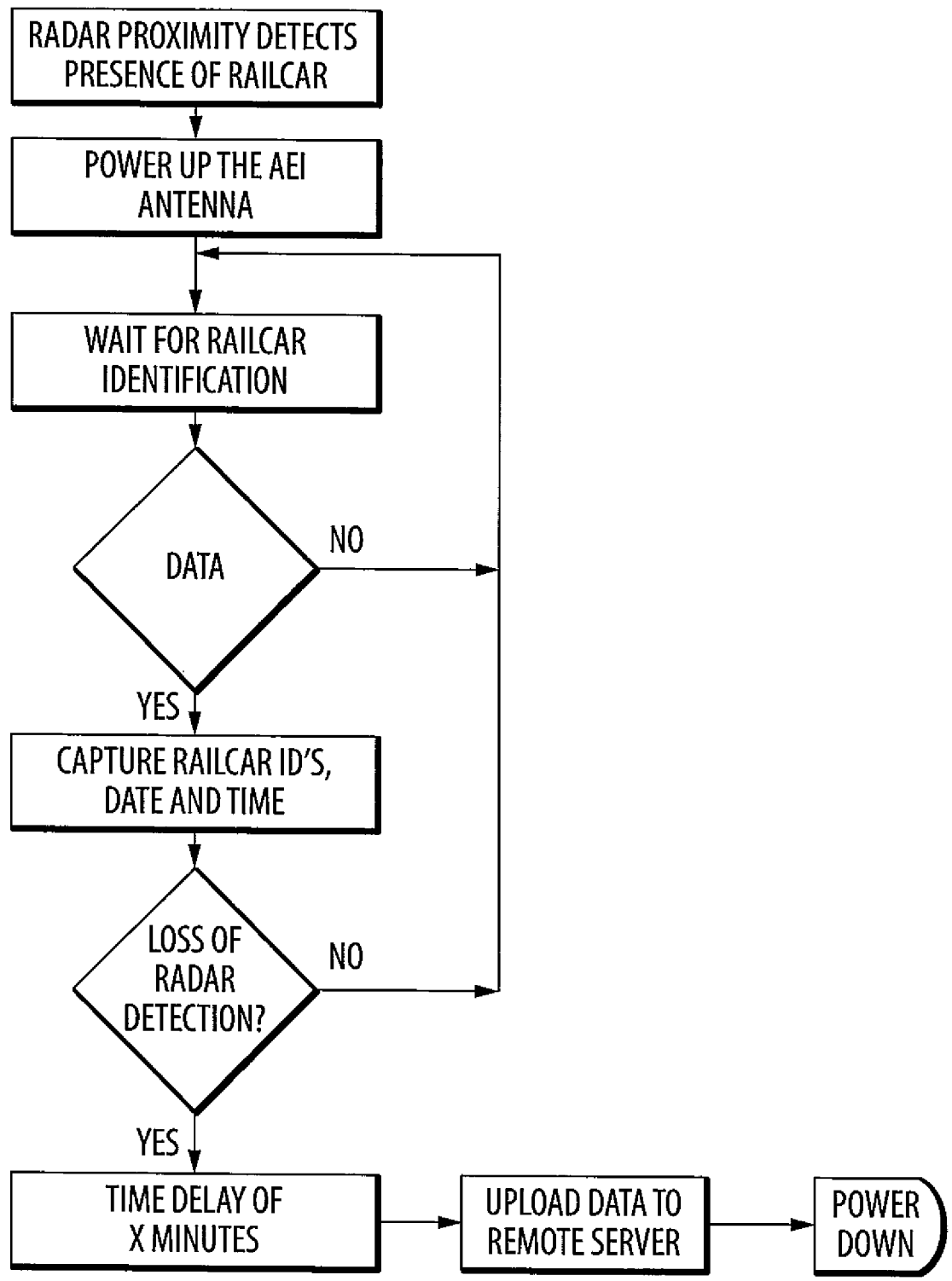
FIG. 9 is a schematic illustration of a logic flow diagram and shows a flow diagram of the sequences of actions that would take place during the railcar scanning operation.

FIG. 9 is a representative example of the logic flow of decisions and information between the PLC and the various components in the scanner station. The actual logic flow may be somewhat different for each scanner station, depending on the requirements at each scanner site.

The arrangements are described above can be used with an apparatus for managing transportation vehicles of the type comprising:

a plurality of container each having a mounting arrangement for attachment to a respective one of the vehicles;

the container containing:

a memory for storing received information;

a transmitter for wirelessly transmitting required information from the memory when requested;

a receiver for receiving a wireless request signal;

a power supply;

a writer for storing data in the memory, the data including:

a secure section of data defining for the vehicle cargo packing slip information;

a non-secure section of data defining for the vehicle safety information relating to the current vehicle contents;

a first reader device for receiving the data in the secure section in response to a request signal sent by the first reader device and arranged to provide to an authorized person the vehicle cargo packing slip information;

and second portable reader device for receiving the data in the non-secure section in response to a request signal sent by the second reader device;

the second reader device being arranged to provide to a person in possession of the second reader device only data from the non-secure section defining for the vehicle said safety information relating to the current vehicle contents and not the data from the secure section.

The container includes a GPS system for detecting a current location of the container. The transmitter has a range greater than one mile and preferably of the order of five miles. The first reader device comprises a read/write device for writing the secure and non-secure sections of the data. The secure section is rendered secure to the second reader device by encryption. However the secure section can be rendered secure by allowing it to be transmitted only in response to a request signal from the first reader device. The secure section is encrypted by the data writer which enters the data into the memory. The secure section is decrypted by the first reader device. The vehicle cargo packing slip information includes: the waybill, the bill of lading, loading and offloading instructions, product description and hazardous materials warnings. The vehicle safety information includes: the vehicle identification, a load-empty status, current and/or previous cargo description and code, and emergency contact information. The first reader device is arranged to be located at a loading access terminal so that the secure information is accessible only at the terminal for use by the shipper at the loading terminal and to the consignee at the receiving terminal. The second reader device is arranged to be portable so as to be carried by first responders accessing the vehicles in an emergency. The first reader device is arranged to provide an output of all vehicles within the transmitter range to indicate imminent arrival of the vehicles at the location of the first reader device. In this case the container can include a GPS system for detecting a current location of the container on the vehicles and transmitting it to the reader device. The container comprises an exterior weather proof and secure shell which is resistant to tampering.

Figure 10:
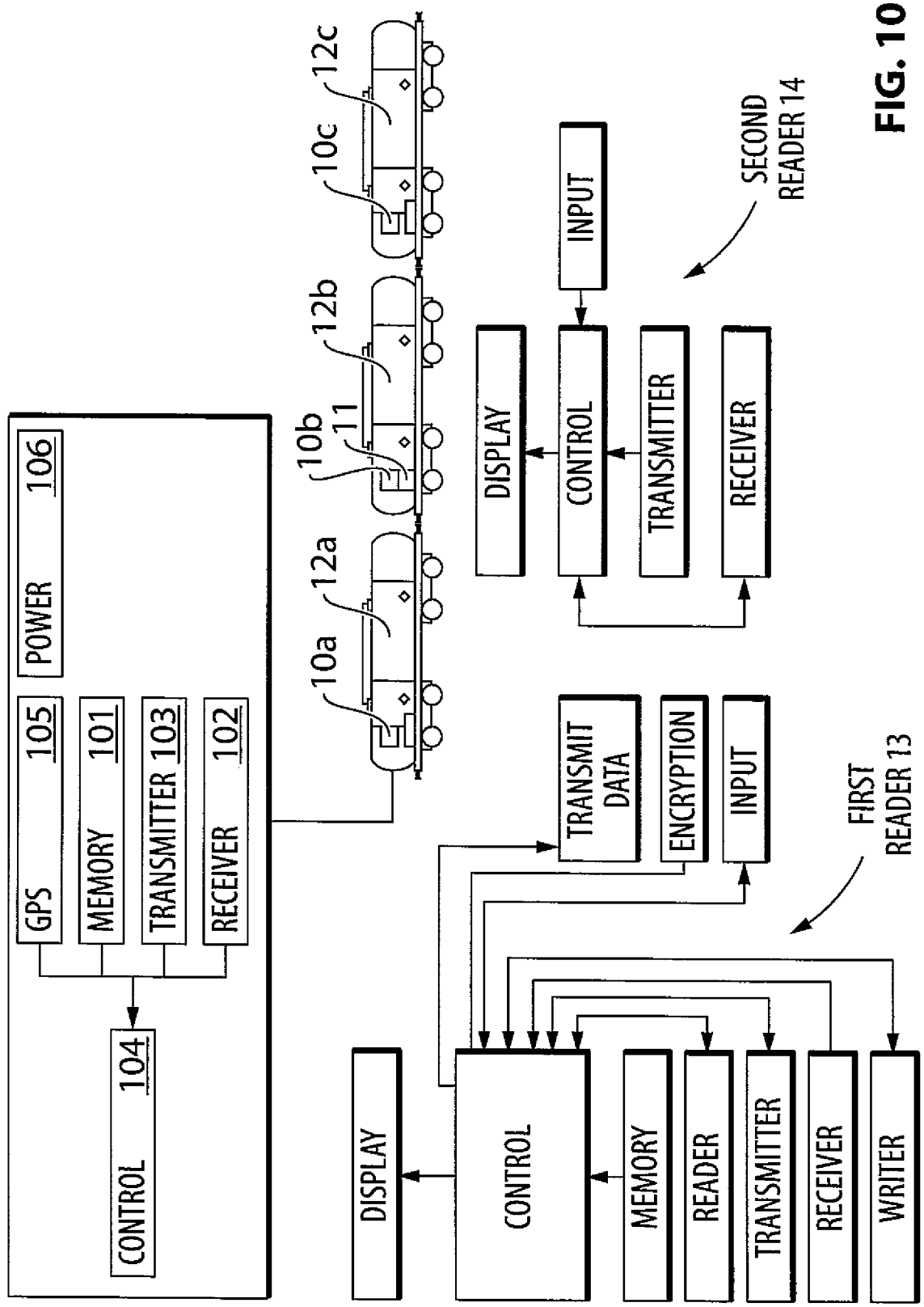
FIG. 10 is a schematic illustration of a possible use of the system of the present invention.

This arrangement as shown in FIG. 10 therefore provides a method of attaching a virtual packing slip to a moving vehicle whereby the loading terminal can convey information relating to the cargo aboard so that the receiving terminal and points along the way can have access to shipping information directly from the vehicle.

The cargo packing slip information, including but not limited to the waybill, the bill of lading, loading and offloading instructions, product description, hazardous materials warnings, is electronically stored in a wireless device, providing the onboard device, to be attached to the moving vehicle. This wireless device has the capability of communicating by radio signals to stationary communications boxes, or "access points". The loading terminal access point is able to transfer or "download" the packing slip information into read/write memory into the onboard device. The receiving terminal, or cargo offloading terminal, can transfer the packing slip utilizing a local access terminal and capture the information into appropriate applications used for accounting, product inventory, sales and similar functions.

The advantage with this process is that the packing slip information travels with the cargo and vehicle without the need for a physical paper or manual attachment of material or information to the vehicle. The receiving terminal is assured that the cargo information is correct and complete, as it has travelled with the cargo, rather than arriving indirectly by mail, facsimile or by electronic Internet means.

The packing slip information and other safety information is stored in read/write memory inside the onboard device. The information is held in two memory areas; one area is a non-secure area for basic cargo information, the other area is a secure data encrypted section.

The non-secure memory area contains the non-confidential information on the shipment, such as railcar or truck-trailer identification, load-empty status, current or previous cargo description and code, and any emergency contact information.

The secure memory area contains any contract confidential information that is only to be visible to the shipper at the loading terminal and to the consignee at the receiving terminal.

This patent has further benefit to first responders. For example, emergency crews who are called out for incidents on railcars have no way to determine what is on board the railcars, other than through the placards attached to the railcars. The placards may already be damaged or in a hazardous condition, or might even be incorrect. If the first responders have an access point available to them, they are able to remotely read the packing slip on each railcar, before approaching the incident area and be better positioned to set up an emergency response plan.

It is therefore an objective to have every rail tank car in North America to be equipped with an onboard device, as a safety feature, and to have access points at all rail loading and offloading terminals for the interchange of electronic packing slips. The arrangement herein can protect the business process of uploading, conveying and downloading of the information inside the onboard device.

Referring specifically to FIG. 10, the apparatus disclosed herein for managing transportation vehicles includes a series of separate containers 10A, 10B, 10C each having a mounting arrangement 111 for attachment to a respective one of the vehicles 12A, 12B, 12C at a suitable location on the vehicle where it can be maintained safely from damage or tampering but is readily accessible on the exterior for repair.

The system further includes first reader devices 113 to be located at the shipping location and at the receiving location and second reader devices 114 which are portable and can be carried by persons requiring information as to the contents of the vehicles such as inspection persons or first responders.

Each container 10A, 10B, 10C includes a memory 101 for storing received information, a transmitter 103 for wirelessly transmitting required information from the memory when requested, a receiver 104 for receiving a wireless request signal, a power supply 107 and a control unit 104 which operates the functions and acts to write data into the memory and to retrieve it from the memory when required, all stored within a secure outer shell 106. The control unit 104 acts as a reader/writer for storing data in the memory 101. The data includes a secure section of data defining for the vehicle cargo packing slip information and a non-secure section of data defining for the vehicle safety information relating to the current vehicle contents;

The first reader device is a read/write device with encryption and can receive both the data in the secure section and the non-secure section in response to a request signal sent by the first reader device and is arranged to provide to an authorized person operating the device the vehicle cargo packing slip information by decrypting the data received.

The second portable reader device 114 is arranged for receiving the data in the non-secure section so that it either does not receive the secure data or cannot decrypt the data if received, in response to a request signal sent by the second reader device The second reader device is arranged to provide to a person such as the first responder in possession of the second reader device which is portable so as to be carried by first responders accessing the vehicles in an emergency only data from the non-secure section defining for the vehicle said safety information relating to the current vehicle contents and not the data from the secure section.

In one mode of operation of the first reader device, it is arranged to provide an output on a display of all vehicles within the transmitter range to indicate imminent arrival of the vehicles at the location of the first reader device. This can be operated with the GPS system for detecting a current location of the container on the vehicles to be transmitted and displayed.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. Apparatus for use in a system for transporting bulk goods comprising a plurality of rail cars arranged to be transported on a rail network to a rail car handling terminal, each rail car having at least one Radio Frequency Identification (RFID) tag including data identifying the rail car; the handling terminal comprising a plurality of rail track spur lines each for receiving one or more of said plurality of rail cars and a center control hub, the apparatus comprising:
  a plurality of trackside-mounted scanning stations each for mounting adjacent to a respective one of the spur lines and each including a control system;
  a wide area point-to-point wireless communications network communicating with each of said scanning stations;
  each scanning station comprising a self-contained, weatherproof unit;
  each scanning station being self-powered utilizing solar energy or other sources so as not to require connection to an exterior power supply;
  each scanning station comprising a Radio Frequency Identification (RFID) reader having an antenna for powering and reading the RFID tag of an adjacent one of said plurality of rail cars so as to provide rail car data from the RFID tag to the control system;
  each scanning station having mounted thereon two radar proximity detectors mounted on the unit so that each is responsive to presence of the adjacent one of said plurality of rail cars at a predetermined distance from the detector;
  each of the two radar proximity detectors being mounted on the scanning station so that each is directed longitudinally along the track in a respective one of two directions of travel of the rail cars along the track so as to determine the presence of the adjacent one of said plurality of rail cars moving along the track when approaching from the respective direction;
  the two radar proximity detectors and the control system being arranged so as to determine the direction of travel of the adjacent one of said plurality of rail cars along the track;
  said RFID reader having a quiescent mode in which power from the antenna is turned off from which mode the reader can be activated;
  said radar proximity detectors being always-on so as to detect the presence of the adjacent one of said plurality of rail cars and being arranged to activate the reader from the quiescent mode on detection of the adjacent one of said plurality of rail cars;
  said RFID reader being arranged to revert to the quiescent mode after reading the RFID tag of the adjacent one of said plurality of rail cars.

2. The apparatus according to claim 1 wherein said RFID reader is arranged to revert to the quiescent mode after a predetermined time period.

3. The apparatus according to claim 1 wherein the scanner station transmits the rail car data to adjacent scanner stations by wireless communications such that a master station for data communications collects all rail car data which is read by a plurality of the stations and communicates that collected rail car data to a remote server.

4. The apparatus according to claim 1 wherein some of the plurality of scanning stations are arranged at specific operating components of the rail car handling terminal.

5. The apparatus according to claim 1 wherein the two radar proximity detectors are set such that the predetermined distance is substantially equal to the length of one rail car.

6. The apparatus according to claim 1 wherein the control system includes logic to determine multiple readings of data from the adjacent one of said plurality of rail cars to extract and communicate only one reading from the multiple readings.

7. The apparatus according to claim 1 wherein the handling terminal comprises:
  an apparatus for loading into and/or unloading the bulk goods from each of the rail cars, the apparatus including a metering device for measuring an amount of the bulk goods loaded or unloaded;
  a plurality of portable hand held field computers, each comprising:
    an input interface for manual input by a worker of data relating to the rail cars;
    a display for displaying data to the worker;
    a camera module for obtaining images of the rail cars by the worker;
  said center control hub being arranged to communicate with a communication system of the rail network to obtain from the communication system a Car Location Message (CLM) for each of the rail cars prior to arrival of the rail cars at the rail car handling terminal and to obtain from the communication system a way bill for each of the rail cars prior to arrival of the rail cars at the rail car handling terminal;

the center control hub being arranged to obtain, from a data base using the unique identification indicia, mechanical data relating to each of the rail cars including at least a weight and capacity of the rail car;

the center control hub being arranged to establish a plurality of stages of operation on the rail cars, the stages including at least the following:
arrival from rail network,
loading/unloading;
storage;
cleaning and/or repair;
release to rail network;

the center control hub being arranged to generate data indicating a current stage of each of the rail cars in the rail car handling terminal;

the center control hub being arranged to provide a signal indicative that a selected rail car of said plurality of rail cars can be transferred from one stage to a next stage based on at least some of the data relating to the Car Location Message, the way bill, the mechanical data and the inspection;

the center control hub being arranged to communicate the signal indicative that a rail car can be transferred from said one stage to said next stage to the portable computers to control transfer of the selected rail car from said one stage to said next stage.

8. The apparatus according to claim 7 wherein there is provided a first apparatus for loading rail cars and a second apparatus for unloading rail cars and wherein the center control hub is arranged to control the loading apparatus by providing a signal indicative of an amount of bulk goods to be metered to a full condition of the rail car.

9. The apparatus according to claim 7 wherein the center control hub is arranged to create from the rail car data from the plurality of scanning stations a bill of lading for the rail cars prior to release of the rail car from the release stage of the rail car handling terminal to the rail network.

10. The apparatus according to claim 7 wherein the center control hub is arranged to create a Car Location Message (CLM) for each rail car prior to release of the rail car from the release stage of the rail car handling terminal to the rail network.

11. The apparatus according to claim 7 wherein the center control hub is arranged to create a Car Location Message (CLM) internal to the rail car handling terminal for each rail car prior to release of the rail car from the arrival stage of the rail car handling terminal into the rail car handling terminal and upon transition from each stage to the next stage.

12. The apparatus according to claim 7 wherein scanning stations are arranged at or in advance of the rail car handling terminal for reading said rail car data from each rail car including a location, way bill and Car Location Message (CLM).

13. The apparatus according to claim 7 wherein the center control hub is arranged to provide signals allowing loading of said selected rail car dependent on information relating to a previous load obtained from the previous way bill.

14. The apparatus according to claim 7 wherein the center control hub is arranged to provide signals requiring cleaning of a rail car dependent prior to loading on information relating to a previous load obtained from a previous way bill.

15. The apparatus according to claim 7 wherein the center control hub is arranged to generate from the rail car data from the plurality of scanning stations an output on said display providing rail car data relating to all rail cars in the rail car handling terminal and their current stage.

16. The apparatus according to claim 7 wherein the center control hub is arranged to generate from the rail car data from the plurality of scanning stations an output on said display providing data relating at least some of the stages and the identification of the rail cars in those stages.

17. The apparatus according to claim 7 wherein the center control hub is arranged to store from the rail car data from the plurality of scanning stations for each rail car in the release stage information relating to identification of the rail car, load in the rail car, inspections carried out on the rail car and photographs of inspected parts of the rail car.

* * * * *